No. 721,912. PATENTED MAR. 3, 1903.
J. W. PACKARD & W. A. HATCHER.
RUNNING GEAR FOR MOTOR VEHICLES.
APPLICATION FILED MAR. 10, 1902.
NO MODEL. 3 SHEETS—SHEET 1.
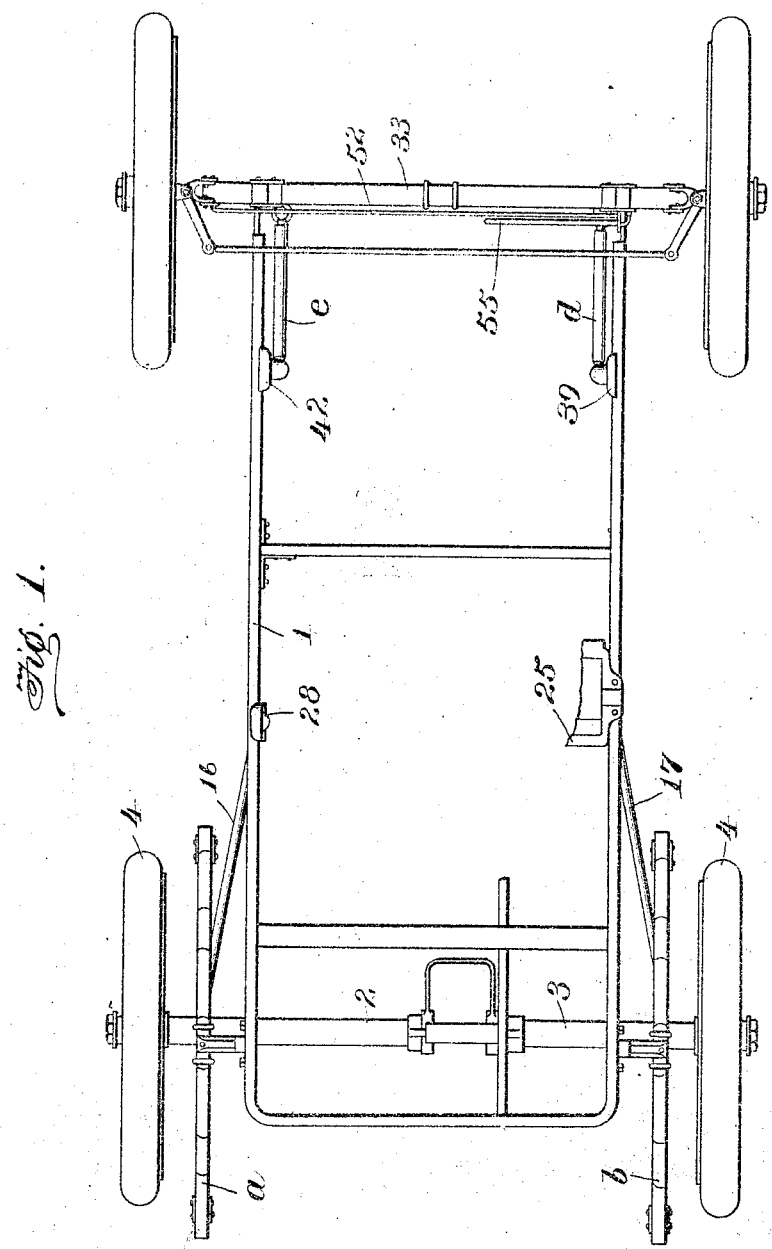
Witnesses
Inventors
J. W. Packard
W. A. Hatcher No. 721,912. PATENTED MAR. 3, 1903.
J. W. PACKARD & W. A. HATCHER.
RUNNING GEAR FOR MOTOR VEHICLES.
APPLICATION FILED MAR. 10, 1902.
NO MODEL. 3 SHEETS—SHEET 2.
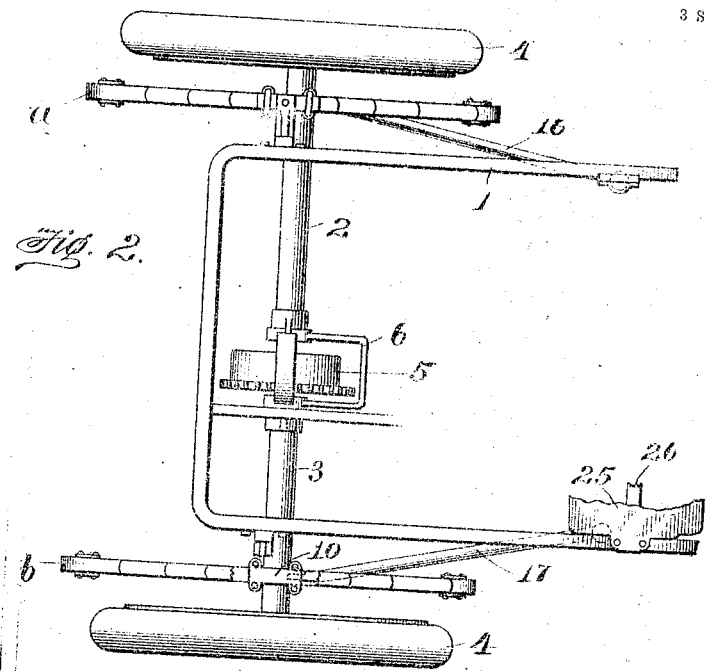
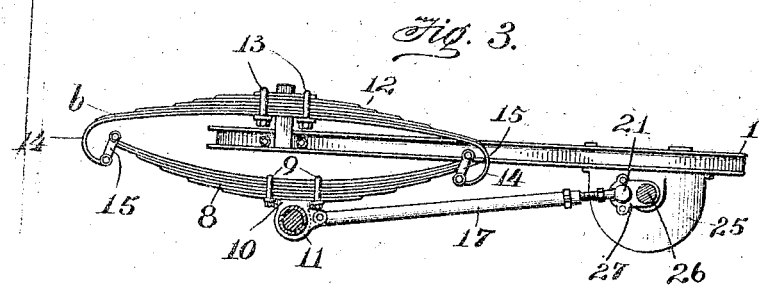
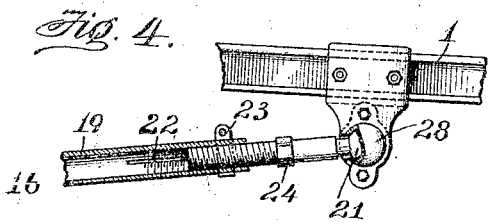
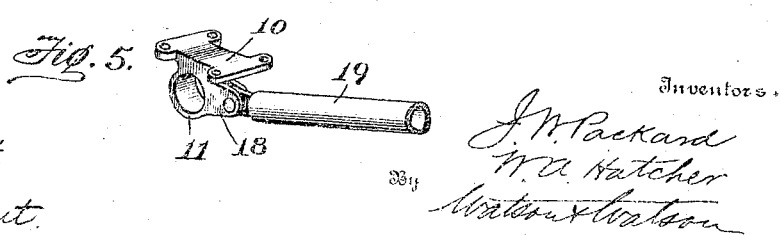
Witnesses
Fenton S. Belt,
C. W. Clement.
Inventors,
J. W. Packard
W. A. Hatcher
By Watson & Watson
Attorneys No. 721,912. PATENTED MAR. 3, 1903.
J. W. PACKARD & W. A. HATCHER.
RUNNING GEAR FOR MOTOR VEHICLES.
APPLICATION FILED MAR. 10, 1902.
NO MODEL. 3 SHEETS—SHEET 3.
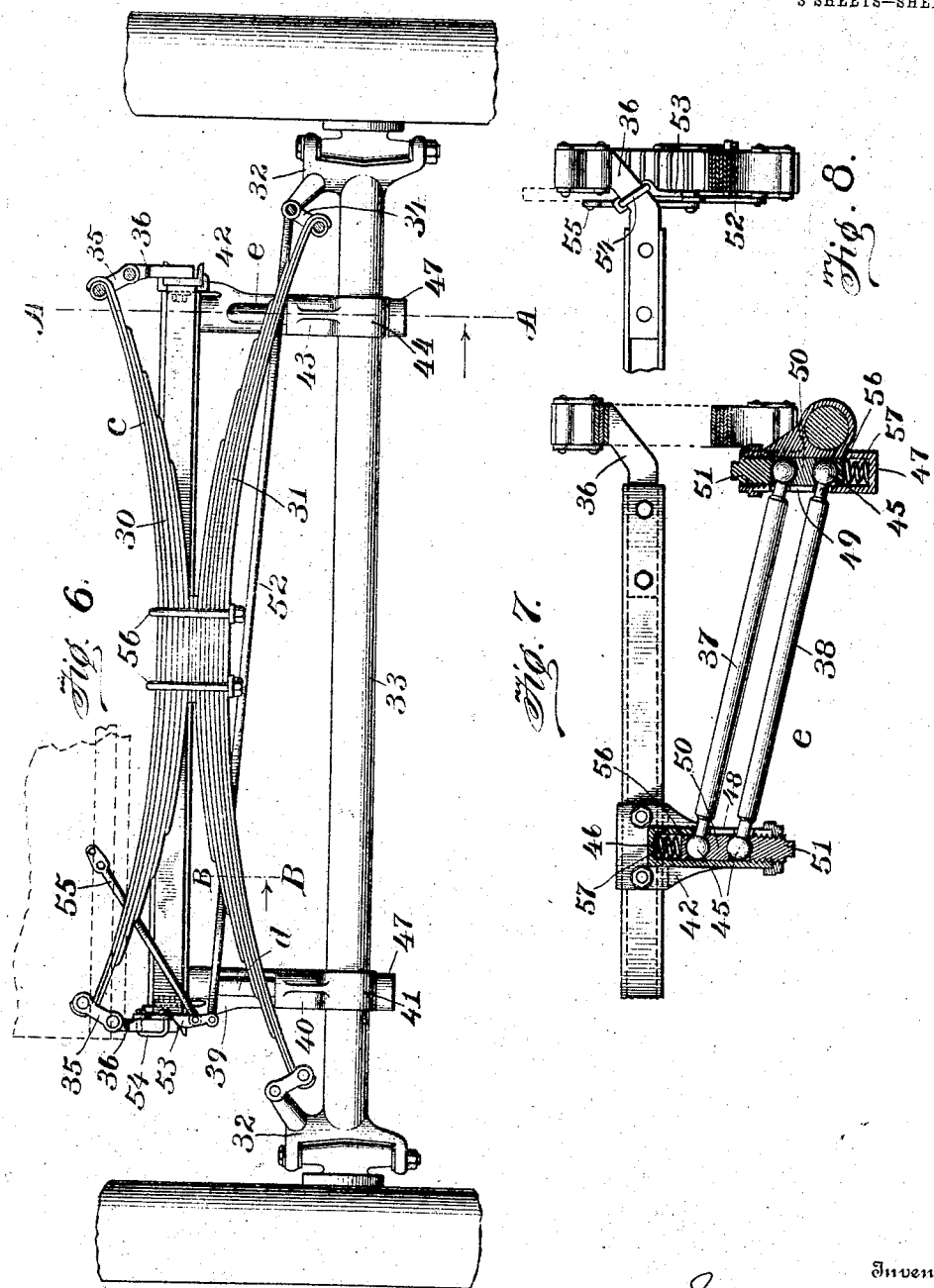

UNITED STATES PATENT OFFICE.

JAMES W. PACKARD AND WILLIAM A. HATCHER, OF WARREN, OHIO, ASSIGNORS TO OHIO AUTOMOBILE COMPANY, OF WARREN, OHIO, A CORPORATION OF WEST VIRGINIA.

RUNNING-GEAR FOR MOTOR-VEHICLES.

SPECIFICATION forming part of Letters Patent No. 721,912, dated March 3, 1903.

Application filed March 10, 1902. Serial No. 97,431. (No model.)

*To all whom it may concern:*

Be it known that we, JAMES W. PACKARD and WILLIAM A. HATCHER, citizens of the United States, residing at Warren, in the county of Trumbull, State of Ohio, have invented certain new and useful Improvements in Running-Gear for Motor-Vehicles, of which the following is a specification.

The purpose of this invention is to provide improved means for connecting the frame or body of a motor-vehicle to the axles, whereby the driving-axle may be adjusted relatively to the frame and power-shaft to compensate for stretch in the driving-chain and whereby the forward fixed axle is held against tendency to rotate upon its axis and the frame and body are braced against lateral movement without interfering with the free action of the springs.

In the accompanying drawings, Figure 1 is a plan view of a motor-vehicle frame and running-gear embodying our improvements. Fig. 2 is a plan view of the rear portion of the frame and running-gear, one of the springs being broken away at the center. Fig. 3 is a side view of the rear portion of the frame. Fig. 4 is a view showing in detail the connections between the forward end of one of the adjustable stay-rods and the frame. Fig. 5 is a detail view showing the connection of said rod to the axle-sleeve. Fig. 6 is a view showing the spring-supports for the forward end of the vehicle-frame and means for bracing the vehicle frame and body against lateral motion. Fig. 7 is a view on the line A A of Fig. 6, showing the connections between the forward axle and the vehicle-frame; and Fig. 8 is a detail view taken on the left of Fig. 6, the spring being in section on the line B B.

Referring to Figs. 1 to 5, inclusive, of the drawings, 1 indicates the frame of a motor-vehicle, and 2 and 3 indicate the two fixed tubular half-axles, within which are arranged the driving-axles, the latter being connected to the rear wheels 4 and to differential gearing 5, arranged within the yoke 6, connecting the two parts of the stationary axle. The frame is supported upon the axle by springs *a* and *b*, each spring comprising a semi-elliptical part 8, secured by clips 9 to a clip-plate 10, which is formed upon a sleeve 11 upon the tubular axle, and a longer semi-elliptical part 12, which is secured to the frame by suitable clips 13 and has its ends 14 bent downwardly around the ends of the part 8 and connected to the ends of the part 8 by links 15. The vehicle-frame is thus suspended from the lower parts of the springs, and the rear axle may be adjusted forward or back relatively to the frame without straining the springs. The axle and vehicle-frame are held against relative movement lengthwise of the frame by means of a pair of adjustable stay-rods 16 and 17, which are pivotally connected at their forward ends to the sides of the frame and at their rear ends to the sleeves 11 beneath the springs *a* and *b*, respectively. As shown in Fig. 5, the sleeves 11 are provided with forks or clevises 18, in which the ends of the rods are hinged or pivoted in such manner as to permit movement of the rods in vertical planes. Each rod, as shown in Fig. 4, comprises a tubular portion 19 and a bar 20, which is connected thereto by a threaded joint, said part 20 having a spherical outer end 21. The part 19 is longitudinally split, as shown at 22, and said split end is clamped around the threaded ends of the part 20 by means of a clip 23. The part 20 may be turned within the part 19 by means of a wrench applied to an angular portion 24 upon the bar 20, and the total length of the stay-rod may thereby be shortened or lengthened. Secured to the frame of the vehicle is a gear-casing 25, within which is journaled the shaft 26, from which power is transmitted by a sprocket-chain to the differential gear 5. The spherical head of the stay-rod 17 is held within a socket 27, formed upon the gear-casing immediately in the rear of the shaft 26 by a suitable cap-plate, (not shown in the drawings,) and the spherical head of the stay-rod 16 is journaled within a socket 28 upon the opposite side of the frame and directly in line with the head upon the rod 17. The cap-plate of the socket 28 is shown in dotted lines in Fig. 4. By shortening or lengthening the stay-rods it will be seen that the axle may be moved forwardly or rearwardly relatively to the frame of the vehicle, and by this means the slack in the sprocket-chain may be taken up as the latter stretches from wear. Owing to the manner in which the springs are constructed and connected the springs are not strained longitudinally by the adjustment of the axle and resist pressure in a vertical direction equally well in all positions of the axle. In applying a new sprocket-chain to the machine the rods will first be shortened, thereby drawing the axle forward of the central part of the spring 12, as shown in Fig. 3. Thereafter as stretch in the chain occurs the rods will be adjusted to increase their lengths, thus compensating for the stretch in the chain. It is desirable to hinge or pivot the forward ends of the rods at or near the center line of the shaft 26, which is the axis of the driving sprocket-wheel.

The forward part of the vehicle, as shown in Fig. 6, is suspended from a spring c, arranged transversely of the vehicle and comprising two semi-elliptical parts 30 and 31, arranged back to back and united in the center by clips 56. The ends of the lower part 31 are suspended from the pivot-bearing or knuckles 32 upon the opposite ends of the front axle 33 by links 34. The ends of the upper part 30 of the springs are connected by links 35 to the upwardly-projecting ends 36 of the side bars of the frame. The entire frame is therefore suspended from the forward and rear springs.

The front axle is maintained in its position at right angles to the frame by means of two pairs of thrust-bars d and e. The rear ends of the bars d are pivotally secured in a bracket 39, attached to a side bar of the frame, and the forward ends of the bars are pivotally connected to a bracket 40, having a sleeve 41, which is secured to the axle 33. Similarly, the rear ends of the bars e are pivoted in a bracket 42, secured to the opposite side bar of the frame, and the forward ends of said thrust-bars are pivotally connected to a bracket 43, having a sleeve 44 upon the axle 33. The manner of connecting the thrust-bars to the frame and axle is illustrated in Fig. 7. In said figure the bars 37 and 38 are provided with spherical heads 45 at each end. The bracket 42, which depends from the side bar of the frame, has a socket 46 extending upwardly from its lower end, and the bracket 43 has a similar socket 47. A vertical slot 48 is formed in the front wall of the socket 46, and a similar slot 49 is formed in the rear wall of the socket 47. The thrust-bars are arranged parallel with one another with their spherical heads within the sockets, said bars extending through the slots 48 and 49. The bars are spaced apart by blocks 50, fitting within the sockets and having concave faces which bear against the spherical heads 45, and follower-blocks 56 and springs 57 are interposed between the bases of the sockets and the adjacent heads. The heads, blocks, and springs are secured in place by means of plugs 51, which are threaded into the ends of the sockets, said plugs also having concave faces which bear against the adjacent spherical heads of the bars. The parallel thrust-bars hold the front axle rigidly against any tendency to turn upon its axis, while permitting free movement of the axle and frame vertically relatively to one another, and the compression-springs 57 take up lost motion as wear occurs and prevent rattling of the parts. These springs may be otherwise disposed within the sockets—as, for instance, at the outer ends instead of the inner ends or between the spherical heads—or the springs may be omitted or applied in only one of each pair of sockets.

In order to prevent too free lateral motion of the forward end of the vehicle-body relatively to the axle, the frame is pivotally connected to the axle by a rod or link 52, extending from the pivot-bearing 32 on one side of the front axle to a bracket 53, connected by a clip 54 to the side bar upon the opposite side of the frame. This arrangement permits relative movement of the parts in a vertical direction and steadies the forward end of the vehicle laterally. A diagonal brace-rod 55 is also connected to the bracket 53 and to the body of the vehicle and braces the body laterally relatively to the frame. The rear end of the vehicle-frame is held against lateral movement by the springs, which extend longitudinally of the vehicle.

Having thus described our invention, what we claim, and desire to secure by Letters Patent, is—

1. In a motor-vehicle, the combination of the driving-axle, the frame, two-part springs extending transversely of the axle, each spring being composed of a part connected to the frame and a part connected to the axle, said parts being movable relatively to one another in the direction of their length, and longitudinally-adjustable stay-rods pivotally connecting the axle with the frame.

2. In a motor-vehicle, the combination of the driving-axle, the frame, two-part springs extending transversely of the axle, each spring being composed of a part connected to the frame and a part connected to the axle, said parts being movable relatively to one another, in the direction of their length, and stay-rods pivotally connecting the axle with the frame.

3. In a motor-vehicle, the combination of the driving-axle, the frame, two-part elliptical springs extending transversely of the axle and connecting the axle with the frame, the parts of each spring being movable relatively to one another in the direction of their length, and stay-rods pivotally connecting the axle with the frame.

4. In a motor-vehicle, the combination of the driving-axle, the frame, two-part elliptical springs extending transversely of the axle and connecting the axle with the frame, the parts of each spring being connected at their ends by links, and stay-rods pivotally connecting the axle with the frame.

5. In a motor-vehicle, the combination of the driving-axle, the frame, two-part elliptical springs extending transversely of the axle and connecting the axle with the frame, the ends of one part of each spring being bent around the ends of the other part and yieldingly connected thereto.

6. In a motor-vehicle, the combination of the driving-axle, the frame, two-part elliptical springs extending transversely of the axle and connecting the axle with the frame, the ends of one part of each spring being bent around the ends of the other part and connected thereto by links.

7. In a motor-vehicle, the combination with a fixed axle, a frame, and springs connecting the axle with the frame of a pair of brace-rods arranged one above the other and connected at their ends to the axle and frame respectively by ball-and-socket joints.

8. In a motor-vehicle, the combination with a fixed axle, a frame and springs connecting the axle with the frame, of two pairs of brace-rods connecting the frame with the ends of the axle, the rods of each pair being arranged one above the other and having their ends connected to the frame and axle by ball-and-socket joints.

9. In a motor-vehicle, the combination with a fixed axle, a frame and springs connecting the axle with the frame, of vertically-arranged socketed receptacles upon the frame and axle, said receptacles having vertical slots in their walls, and a pair of brace-rods arranged one above the other, said rods extending through the slots and having heads fitting within the sockets.

10. In a motor-vehicle, the combination with a fixed axle, the frame and springs connecting the axle with the frame of a bracket depending from the frame and a bracket secured to the axle, said brackets having vertical sockets therein, and the adjacent walls of said sockets being vertically slotted, of a pair of brace-rods arranged one above the other and extending through the slots into the sockets, said rods having heads journaled within the sockets.

11. In a motor-vehicle, the combination with a fixed axle, the frame and springs connecting the axle with the frame of a pair of brackets depending from opposite sides of the frame and a pair of brackets secured to the ends of the axles, said brackets having vertical sockets therein and the walls of said sockets having vertical slots, and two pairs of brace-rods connecting the axle with the frame, the rods of each pair being arranged one above the other and having their ends extending through the slots and into a socket upon the frame and a socket upon the axle, said ends having heads journaled within the sockets.

12. In a motor-vehicle, the combination with a fixed axle, the frame and springs connecting the axle with the frame, of vertically-arranged socketed receptacles upon the frame and axle, said receptacles having vertical slots in their walls and a pair of brace-rods arranged one above the other, said rods extending through the slots and having heads fitting within the sockets, blocks within the sockets spacing the heads of the rods apart and plugs or caps bearing against the outermost heads of the rods.

13. In a motor-vehicle, the combination with a frame, a fixed axle and springs connecting the axle with the frame, of means for steadying the frame laterally with respect to the axle comprising a rod having one of its ends pivotally connected to the axle at one side of the vehicle and its other end pivotally connected to a fixed part on the frame at the opposite side of the vehicle, said rod being immovable longitudinally relatively to both of its pivotal points.

14. In a motor-vehicle, the combination with the frame, a fixed axle and springs extending longitudinally of the axle and connected by links with the axle and with the frame, of a rod having its ends pivotally connected to fixed parts on the axle and frame respectively, at points separated from one another laterally of the vehicle, said rod being immovable longitudinally relatively to both of its pivotal points.

15. In a motor-vehicle the combination with a fixed axle, the frame and springs connecting the axle with the frame, of vertically-arranged socketed receptacles upon the frame and axle, said receptacles having vertical slots in their walls, a pair of brace-rods arranged one above the other, said rods extending through the slots and having heads fitting within the sockets, blocks within the sockets spacing the heads of the rods apart, and springs interposed between the heads and the ends of the sockets.

16. In a motor-vehicle the combination with a fixed axle, the frame and springs connecting the axle with the frame, of vertically-arranged socketed receptacles upon the frame and axle, said receptacles having vertical slots in their walls, a pair of brace-rods arranged one above the other, said rods extending through the slots and having heads within the sockets, bearings within the sockets for said heads, and springs within the sockets arranged to exert pressure on said bearings.

17. In a motor-vehicle the combination with a fixed axle, the frame and springs connecting the springs and axle with the frame, of vertically-arranged socketed receptacles upon the frame and axle, said receptacles having vertical slots in their walls, a pair of brace-rods arranged one above the other, said rods extending through the slots and having spherical heads fitting within the sockets, bearings for said heads, and a spring within one of said sockets arranged to exert pressure on said bearings.

In testimony whereof we affix our signatures in presence of two witnesses.

JAMES W. PACKARD.
WM. A. HATCHER.

Witnesses:
C. H. DUNLAP,
E. L. WARNER.